United States Patent Office 3,232,944
Patented Feb. 1, 1966

3,232,944
MONOGLYCERIDES OF (CARBOXY PHENYL AMINO) CHLOROQUINOLINES
André Allais, Paris, and Jean Meier, Coeuilly-Champigny, Seine, France, assignors to Roussel-Uclaf, S.A., Paris, France, a corporation of France
No Drawing. Filed July 31, 1963, Ser. No. 299,060
Claims priority, application France, Aug. 20, 1962, 907,282; Nov. 20, 1962, 916,016
8 Claims. (Cl. 260—236)

The invention relates to the novel product, the α-monoglyceride of 4-(2'-carboxyphenylamino)-7-chloroquinoline having the formula

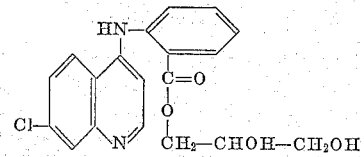

and its non-toxic, pharmaceutically acceptable acid addition salts. The invention also relates to a novel method of preparing the said α-monoglyceride and to novel intermediates formed therein.

In commonly assigned, copending application Serial No. 207,388, filed July 3, 1962, now Patent No. 3,174,972, there are described quinoline derivatives such as 4-(2'-carbomethoxyphenylamino)-7-chloro-quinoline and 4-(2'-carbobutoxyphenylamino)-7-chloro-quinoline which possess an anti-inflammatory and analgesic activity. However, the α-monoglyceride of 4-(2'-carboxyphenylamino)-7-chloro-quinoline of the present invention possesses a remarkable anti-inflammatory and a more intense and more regular analgesic activity.

It is an object of the invention to provide the novel product, the α-monoglyceride of 4-(2'-carboxyphenylamino)-7-chloro-quinoline and its acid addition salts.

It is another object of the invention to provide a novel process for the preparation of the α-monoglyceride of 4-(2'-carboxyphenylamino)-7-chloro-quinoline.

It is a further object of the invention to provide novel intermediates for the α-monoglyceride of 4-(2'-carboxyphenylamino)-7-chloro-quinoline.

It is another object of the invention to provide a novel method of relieving pain and inflammatory manifestations.

These and other objects and advantages of the invention will become obvious from the following detailed description.

The novel quinoline derivatives of the invention are selected from the group consisting of the α-monoglyceride of 4-(2'-carboxyphenylamino)-7-chloro-quinoline having the formula

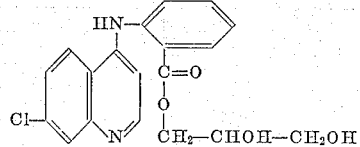

and its non-toxic, pharmacologically acceptable acid addition salts. Examples of suitable acids for the acid addition salts are organic acids such as citric acid, tartaric acid, acetic acid, etc. and inorganic acids such as hydrochloric acid, etc.

The process of the invention for the preparation of the α-monoglyceride of 4-(2'-carboxyphenylamino)-7-chloroquinoline comprises reacting an o-nitrobenzoyl halide with 2,2-dimethyl-4-hydroxymethyl-1,3-dioxolane in the presence of an organic tertiary base to form (2,3-isopropylidenedioxy)-propyl-o-nitrobenzoate, catalytically hydrogenating the latter to form (2,3-isopropylidenedioxy)-propyl-anthranilate, condensing the latter with 4,7-dichloro-quinoline in the presence of a mineral acid to form the corresponding mineral acid salt of the α-monoglyceride of 4-(2'-carboxyphenylamino)-7-chloro-quinoline and reacting the latter with an alkaline agent to form the α-monoglyceride of 4-(2'-carboxyphenylamino)-7-chloro-quinoline which may be reacted with an organic or mineral acid to form the desired acid addition salt.

A preferred mode of the process comprises reacting o-nitrobenzoyl chloride with 2,2-dimethyl-4-hydroxymethyl-1,3-dioxolane in the presence of pyridine, to form (2,3-isopropylidenedioxy)-propyl-o-nitrobenzoate, catalytically hydrogenating the latter in ethanol in the presence of a palladized carbon black catalyst to form (2,3-isopropylidenedioxy)-propyl-anthranilate, condensing the latter with 4,7-dichloro-quinoline in the presence of hydrochloric acid to form the hydrochloride of the α-monoglyceride of 4-(2'-carboxyphenylamino)-7-chloro-quinoline, reacting the latter with an ammonia solution to form the α-monoglyceride of 4-(2'-carboxyphenylamino)-7-chloro-quinoline. The reaction scheme is illustrated in Table I.

TABLE I

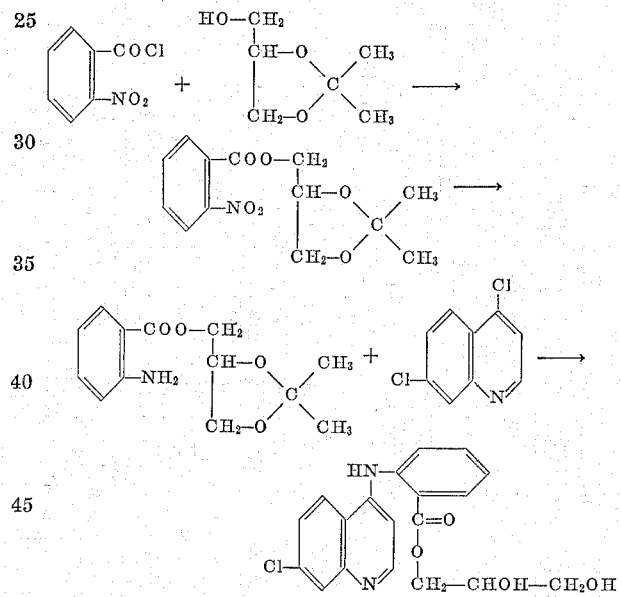

The novel analgesic and anti-inflammatory compositions of the invention are comprised of a compound selected from the group consisting of the α-monoglyceride of 4-(2'-carboxyphenylamino)-7-chloro-quinoline and its non-toxic pharmacologically acceptable acid addition salts and a major amount of a pharmacological carrier. The compositions can be used for the treatment of muscular, articular or nervous pains, rheumatic disturbances, toothaches, zona, migraines and febrile and infectious states.

The compositions may be in the form of injectable solutions, of injectable suspensions, prepared in ampules, in multiple-dose flacons, of tablets, of sugar-coated tablets, of syrups, of suppositories and of pomades.

The novel method of relieving pain and inflammatory manifestations comprises administering an effective amount of a compound selected from the group consisting of the α-monoglyceride of 4-(2'-carboxyphenylamino)-7-chloro-quinoline and its non-toxic, pharmacologically acceptable acid addition salts. The usual dosage is 0.100 to 0.200 gm. per individual dose and 0.200 to 0.500 gm. per day in the adult depending upon the method of administration. The said quinolines may be administered orally, transcutaneously, topically on the skin and mucous membranes or rectally.

In the following example there are described several preferred embodiments to illustrate the invention. However, it should be understood that the invention is not intended to be limited to the specific embodiments.

EXAMPLE

*Preparation of the α-monoglyceride of 4-(2'-carboxyphenylamino)-7-chloro-quinoline*

Step A: *Preparation of (2,3-isopropylidenedioxy)-propyl o-nitrobenzoate.*—59.6 gm. of 2,2 - dimethyl - 4 - hydroxymethyl-1,3-dioxolane were dissolved under agitation in 60 cc. of anhydrous pyridine. The solution was cooled to +5° C. and 86.5 gm. of o-nitrobenzoyl chloride (prepared by Lockermann et al., Ber., vol. 80, p. 488, 1947) were slowly introduced into it. The reaction mixture was agitated for a period of two hours at room temperature and then was poured into 500 cc. of ether. The mixture was filtered and the filtrate was washed successively with 0.5 N sulfuric acid solution, with aqueous sodium bicarbonate solution and finally with water until the wash waters were neutral. The washed solution was dried over sodium sulfate and filtered again. The filtrate was distilled to dryness under vacuum to obtain 116.5 gm. (being a yield of 92%) of (2,3-isopropylidenedioxy)-propyl o-nitrobenzoate in the form of a yellow oil which distilled at 178–180° C. at a pressure of 1 mm.

*Analysis.* — $C_{13}H_{15}O_6N$, molecular weight=281.26. Calculated: C, 55.51%; H, 5.38%; N, 4.98%. Found: C, 55.8%; H, 5.4%; N, 5.0%.

This compound is not described in the literature.

Step B: *Preparation of (2,3-isopropylidenedioxy)-propyl anthranilate.*—80 gm. of (2,3-isopropylidenedioxy)-propyl o-nitrobenzoate, obtained as described in Step A, were subjected to hydrogenation for a period of one hour in 800 cc. of absolute alcohol in the presence of 2 gm. of palladized carbon black as catalyst. The reaction mixture was filtered and the filtrate was evaporated under vacuum to obtain 70.5 gm. (being a yield of 98.5%) of (2,3-isopropylidenedioxy)-propyl anthranilate in the form of a yellow oil which distilled at 159–160° C. under 0.5 mm. of pressure.

*Analysis.* — $C_{13}H_{17}O_4N$, molecular weight=251.28. Calculated: C, 62.13%; H, 6.82%; N, 5.58%. Found: C, 62.1%; H, 6.9%; N, 5.6%.

This compound is not described in the literature.

Step C: *Preparation of the α-monoglyceride of 4-(2'-carboxyphenylamino)-7-chloro-quinoline.*—A mixture of 48 gm. of (2,3-isopropylidenedioxy)-propyl anthranilate, 36 gm. of 4,7-dichloro-quinoline, 36 cc. of concentrated hydrochloric acid and 300 cc. of water was agitated while heating to reflux for a period of two hours. The reaction mixture was filtered and the filtrate was allowed to stand at a temperature of 0° C. for a period of three hours. The hydrochloride salt was then vacuum filtered and the salt was taken up in 600 cc. 50% methanol at reflux. The solution was made alkaline by the addition of 120 cc. of amonia solution and iced for a period of one hour. The crystalline precipitate obtained was vacuum filtered, washed with water and dried to obtain 38.5 gm. (being a yield of 56%) of the α-monoglyceride of 4-(2'-carboxyphenylamino)-7-chloro-quinoline having a melting point of 165° C.

The product occured in the form of pale yellow prisms and was insoluble in water, ether, benzene, diluted alcohols, olive oil and chloroform, slightly soluble in absolute alcohol, dioxane, tetrahydrofuran and acetone, and soluble in dilute aqueous acids and alkalis.

*Analysis.* — $C_{19}H_{17}O_4N_2Cl$, molecular weight=372.8. Calculated: C, 61.21%; H, 4.59%; N, 7.51%; Cl, 9.51%. Found: C, 61.5%; H, 4.5%; N, 7.3%; Cl, 9.6%.

This compound is not described in the literature.

PHARMACOLOGICAL STUDY

Analgesic activity

The test employed was based on the fact noted by Koster et al. (Fed. Proc., 1959, 18, 412) according to which the introperitoneal injection of acetic acid provoked repeated characteristic movements of stretching and twisting persisting in mice for more than six hours. Analgesics prevent or suppress this syndrome which is an exterior manifestation of a diffuse abdominal pain.

A solution of 6 parts per thousand of acetic acid in water containing 10% of arabic gum was employed and the dose releasing the syndrome in mice under these conditions was 0.01 cc./gm., being 60 mg./kg. of acetic acid. The analgesics were administered orally to groups of five mice, which had not been fed for 24 hours, a half hour before the intra-peritoneal injection of the acetic acid. The stretchings were observed, noted and counted for each mouse and then additionally by groups of five, during a period of observation of fifteen minutes immediately after the injection of acetic acid. The average number of stretchings observed on the twelve control groups of five mice during the period of observation indicated, was established at 505 per group.

The product of the invention which was administered in the form of an aqueous suspension containing polysorbate 80 diminished the number of stretchings in a fashion obviously proportional to the doses utilized, as is shown in Table II which compares 4-(2'-carbomethoxyphenylamino)-7-chloro-quinoline and aspirin with the said α-monoglyceride.

TABLE II

| Test compound | Doses utilized in mg./kg. | Number of stretchings 0 to 15 minutes | Percent of stretchings by reference to the average of the controls | $DE_{50}$—Dose necessary to reduce stretching by one-half mg./kg. |
|---|---|---|---|---|
| Controls: | | | | |
| Group No. 1 | | 420 | | |
| Group No. 2 | | 522 | | |
| Group No. 3 | | 572 | | |
| Average | | 505 | | |
| The α-monoglyceride of 4-(2'-carboxyphenylamino)-7-chloroquinoline. | 20 | 265 | 52 | |
| | 50 | 221 | 44 | 30 |
| | 100 | 89 | 18 | |
| 4-(2'-carbomethoxy-phenylamino)-7-chloroquinoline. | 20 | 395 | 78 | |
| | 50 | 505 | 100 | 100 |
| | 100 | 241 | 48 | |
| Aspirin | 50 | 469 | 93 | |
| | 100 | 402 | 80 | 200 |
| | 200 | 243 | 48 | |

Table II shows that the α-monoglyceride of 4-(2'-carboxyphenylamino)-7-chloro-quinoline is more than twice as active than 4-(2'-carbomethoxyphenylamino)-7-chloro-quinoline and more than 4 times more active than aspirin.

Anti-inflammatory activity (A) *Test of the edematized paw in the rat.*—The test consisted in administering to rats weighing from 160 to 170 gm. in a single injection 500 γ of naphthoylheparamine in the aponeurotic pad of a posterior paw in order to provoke the formation of an inflammatory edema. The products to be studied were administered orally one hour before the injection. The maximum circumference of the two posterior paws was measured three hours after the injection and the difference between the circumferences of the two posterior paws of each animal (paw having received the injection of naphthoylheparamine and the intact paw) served to evaluate the extent of the inflammation. The measure of the inflammation in the treated rats was expressed in percentage with reference to those of the control animals.

The following results were obtained:

With aspirin: The average efficacious dose $DE_{50}$ was 100 mg./kg.

With amodiaquinine: The average efficacious dose $DE_{50}$ was greater than 200 mg./kg.

With the α-monoglyceride of 4-(2'-carboxyphenylamino)-7-chloro-quinoline: A dose of 50 mg./kg. brought about a diminution of the percentage of edema of 48% and a dose of 100 mg./kg. brought about a diminution of the percentage of edema of 62%. The average efficacious dose $DE_{50}$ is thus about 60 mg./kg.

(B) *Test of erythema by ultraviolet rays.*—This test consisted in exposing a lot of guinea pigs whose dorsal skin was previously shaved to irradiation by means of a lamp generating ultraviolet rays for a period of two minutes at a distance of 20 cm. The erythema provoked was evaluated two hours after this exposure by an arbitrary scale going from 0 to 3 by two observers ignorant of the treatment undergone by the animals. The average degree of the erythema was established by groups by taking the average of all of the observations and the anti-inflammatory effect was expressed in percentage of erythema remaining on the treated animals with reference to those of the controls having received only the dispersant. The products to be studied were administered orally one hour before the exposure to ultraviolet rays and the results obtained are summarized in Table III.

TABLE III

| Doses in mg./kg. | Degree of erythema remaining as a percent of the controls | |
|---|---|---|
| | The α-monoglyceride of 4-(2'-carboxyphenylamino)-7-chloro-quinoline | 4-(2'-carbomethoxyphenylamino)-7-chloro-quinoline |
| 25 | 97 (5) | |
| 50 | 53 (5) | |
| 100 | 22 (6) | 64 (11) |

The values between the parenthesis indicate the number of guinea pigs treated.

The $DE_{50}$ of the α-monoglyceride of 4-(2'-carboxyphenylamino)-7-chloro-quinoline was about 50 mg./kg. as compared to 100 mg./kg. for 4-(2'-carbomethoxyphenylamino)-7-chloro-quinoline, 50–100 mg./kg. for aspirin and 100 mg./kg. for amodiaquinine.

*Acute toxicity on mice by oral administration*

The products to be tested were utilized in aqueous suspensions containing polysorbate 80 and were each administered orally with the aid of a gastric tube at doses of 1 and 2 gm./kg. to two groups of ten mice which had been starved from the day before. The animals were held under observation for a period of eight days and the phenomena of intoxication or the mortality was noted each day. The animals exhibited a depressive state for several moments after the injection. At a dose of 1 gm./kg., a mortality of three animals was observed and at a dose of 2 gm./kg., a mortality of four animals out of ten was observed. The $LD_{50}$ is thus greater than 2 gm./kg., while the $LD_{50}$ for aspirin is 1.5 gm./kg. under the same conditions.

A second test was run to compare the toxicity of the α-monoglyceride of 4-(2'-carboxyphenylamino)-7-chloro-quinoline with that of 4-(2'-carbomethoxyphenylamino)-7-chloro-quinoline. The compounds were administered orally in suspensions to groups of rats at dosages of 1 and 2 gm./kg. every day except Sunday, i.e., 12 times in fourteen days and the mortality and frequency of intestinal ulcers was determined. The results are summarized in Table IV.

TABLE IV

| Compound administered | Doses in mg./kg. | Number of rats | Mortality | | Intestinal Ulcers | |
|---|---|---|---|---|---|---|
| | | | Absolute value | Percent | Frequency | Percent |
| Controls with dispersant | | 40 | 0 | 0 | 0 | 0 |
| 4-(2'-carbomethoxyphenylamino)-7-chloro-quinoline. | 100 | 8 | 1 | 12 | 0 | 0 |
| | 200 | 16 | 3 | 19 | 6/15 | 40 |
| The α-monoglyceride of 4-(2'-carboxyphenylamino)-7-chloro-quinoline. | 100 | 8 | 0 | 0 | 0 | 0 |
| | 200 | 8 | 0 | 0 | 1 | 12 |

As can be seen from Table IV the α-monoglyceride of 4-(2'-carboxyphenylamino)-7-chloro-quinoline is less toxic than 4-(2'-carbomethoxyphenylamino)-7-chloro-quinoline.

Various modifications of the compositions and process of the invention may be made without departing from the spirit or scope thereof and it is to be understood that the invention is intended to be limited only as defined in the appended claims.

We claim:

1. A compound selected from the group consisting of the α-monoglyceride of 4-(2'-carboxyphenylamino)-7-chloro-quinoline and its non-toxic, pharmaceutically acceptable acid addition salts.

2. The α-monoglyceride of 4-(2'-carboxyphenylamino)-7-chloro-quinoline.

3. The hydrochloride of the α-monoglyceride of 4-(2'-carboxyphenylamino)-7-chloro-quinoline.

4. A process for the preparation of the α-monoglyceride of 4-(2'-carboxyphenylamino)-7-chloro-quinoline which comprises reacting an o-nitrobenzoyl halide with 2,2-dimethyl-4-hydroxymethyl-1,3-dioxolane in the presence of an organic tertiary base to form (2,3-isopropylidenedioxy)-propyl o-nitrobenzoate, catalytically hydrogenating the latter to form (2,3-isopropylidenedioxy)-propyl anthranilate, condensing the latter with 4,7-dichloroquinoline in the presence of a mineral acid to form a salt of the α-monoglyceride of 4-(2'-carboxyphenylamino)-7-chloro-quinoline and recovering the α-monoglyceride by reaction of the said salt under alkaline conditions.

5. The process of claim 4 wherein the α-monoglyceride of 4-(2'-carboxyphenylamino)-7-chloro-quinoline is reacted with an acid selected from the group consisting of mineral acids and organic acids to form the corresponding acid addition salt of the said α-monoglyceride.

6. The process of claim 4 wherein the tertiary organic base is pyridine.

7. The process of claim 4 wherein the catalytic hydrogenation is effected in ethanol with a palladized carbon black catalyst.

8. A process for the preparation of the α-monoglyceride of 4-(2'-carboxyphenylamino)-7-chloro-quinoline which comprises reacting o-nitrobenzoyl chloride with 2,2-dimethyl-4-hydroxymethyl-1,3-dioxolane in the presence of pyridine to form (2,3-isopropylidenedioxy)-propyl o-nitro-benozate, catalytically hydrogenating the latter in ethanol in the presence of a palladized carbon black catalyst to form (2,3-isopropylidenedioxy)-propyl anthranilate, condensing the latter with 4,7-dichloro-quinoline in the presence of hydrochloric acid to form the hydrochloride of the α-monoglyceride of 4-(2'-carboxyphenylamino)-7-chloro-quinoline and reacting the latter with an ammonium solution to form the α-monoglyceride of 4-(2'-carboxyphenylamino)-7-chloro-quinoline.

References Cited by the Examiner
UNITED STATES PATENTS

| | | | |
|---|---|---|---|
| 2,474,818 | 7/1949 | Burckhalter et al. | 260—286 |
| 3,026,351 | 3/1962 | Wiegert | 260—471 X |
| 3,068,147 | 12/1962 | Emele | 167—65 |
| 3,109,022 | 10/1963 | Scherrer | 260—471 X |
| 3,132,145 | 5/1964 | Allais et al. | 260—286 |
| 3,150,047 | 9/1964 | Allais | 167—65 |

NICHOLAS S. RIZZO, *Primary Examiner.*

HENRY R. JILES, *Examiner.*

DONALD G. DAUS, *Assistant Examiner.*